US008786901B2

(12) United States Patent  
Shiraishi

(10) Patent No.: US 8,786,901 B2  
(45) Date of Patent: Jul. 22, 2014

(54) IMAGE PROCESSING APPARATUS, IMAGE PROCESSING METHOD, AND COMPUTER PROGRAM PRODUCT

(75) Inventor: Naoto Shiraishi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 66 days.

(21) Appl. No.: 13/482,228

(22) Filed: May 29, 2012

(65) Prior Publication Data

US 2012/0320389 A1 Dec. 20, 2012

(30) Foreign Application Priority Data

Jun. 20, 2011 (JP) ................................. 2011-136771

(51) Int. Cl.
  *G06F 15/00* (2006.01)
  *G06K 15/00* (2006.01)
  *G06K 1/00* (2006.01)

(52) U.S. Cl.
  USPC .......... 358/1.9; 358/1.14; 358/1.16; 358/1.18

(58) Field of Classification Search
  CPC ....................... G06K 15/1851; G06K 15/1863
  USPC .................................. 358/1.1–1.9, 1.11–1.18
  See application file for complete search history.

(56) References Cited

U.S. PATENT DOCUMENTS

| 6,915,017 | B2 | 7/2005 | Shiraishi |
| 6,941,023 | B2 | 9/2005 | Shiraishi |
| 7,079,691 | B2 | 7/2006 | Shiraishi |
| 7,196,802 | B2 * | 3/2007 | Tsuchiya ....................... 358/1.1 |
| 7,233,702 | B2 | 6/2007 | Shiraishi |
| 7,359,557 | B2 | 4/2008 | Shiraishi |
| 7,456,985 | B2 | 11/2008 | Shiraishi |
| 7,483,586 | B2 | 1/2009 | Shiraishi |
| 7,573,614 | B2 | 8/2009 | Shiraishi |
| 8,150,152 | B2 | 4/2012 | Shiraishi |
| 2002/0075532 | A1 | 6/2002 | Shiraishi |
| 2003/0063813 | A1 | 4/2003 | Shiraishi |
| 2005/0151991 | A1 | 7/2005 | Shiraishi |
| 2005/0207667 | A1 | 9/2005 | Shiraishi |

(Continued)

FOREIGN PATENT DOCUMENTS

| JP | 2005-309865 A | 11/2005 |
| JP | 2006-121437 | * 11/2006 |
| JP | 4490783 B2 | 4/2010 |

OTHER PUBLICATIONS

JP 2006-121437.*

(Continued)

*Primary Examiner* — King Poon  
*Assistant Examiner* — Ibrahim Siddo  
(74) *Attorney, Agent, or Firm* — Harness, Dickey, & Pierce. P.L.C.

(57) ABSTRACT

An image processing apparatus draws an image in units of band. The image processing apparatus includes: a first storage unit that stores therein a halftone pattern; an analyzer that analyzes drawing commands, the drawing commands including a first command specifying a drawing band that is the band on which drawing is performed, a second command giving an instruction to read the halftone pattern, and a third command giving an instruction to execute drawing; and a drawing processor that, only when an image, drawing of which is instructed by the second command, is determined as belonging to the drawing band, reads the halftone pattern specified by the first command from the first storage unit to draw that image using the halftone pattern read.

4 Claims, 13 Drawing Sheets

(56) References Cited

U.S. PATENT DOCUMENTS

| | | |
|---|---|---|
| 2006/0072142 A1 | 4/2006 | Shiraishi |
| 2006/0193528 A1 | 8/2006 | Shiraishi |
| 2009/0060325 A1 | 3/2009 | Shiraishi |
| 2009/0128857 A1 | 5/2009 | Shiraishi |
| 2011/0228325 A1 | 9/2011 | Shiraishi |
| 2011/0273736 A1 | 11/2011 | Shiraishi |
| 2011/0280492 A1 | 11/2011 | Shiraishi |

OTHER PUBLICATIONS

English language abstract for patent publication No. JP-2006-121437 (which corresponds to JP-4490783-B2).

* cited by examiner

FIG.5

| BAND INITIALIZATION COMMAND |
|---|
| HALFTONE PATTERN (1) SET COMMAND |
| RECTANGLE (1) DRAWING COMMAND |
| HALFTONE PATTERN (2) SET COMMAND |
| RECTANGLE (2) DRAWING COMMAND |
| HALFTONE PATTERN (3) SET COMMAND |
| RECTANGLE (3) DRAWING COMMAND |
| BAND END COMMAND |

●DRAWING PARAMETER SETTING COMMANDS

●DRAWING EXECUTION COMMANDS

●TERMINATING COMMAND

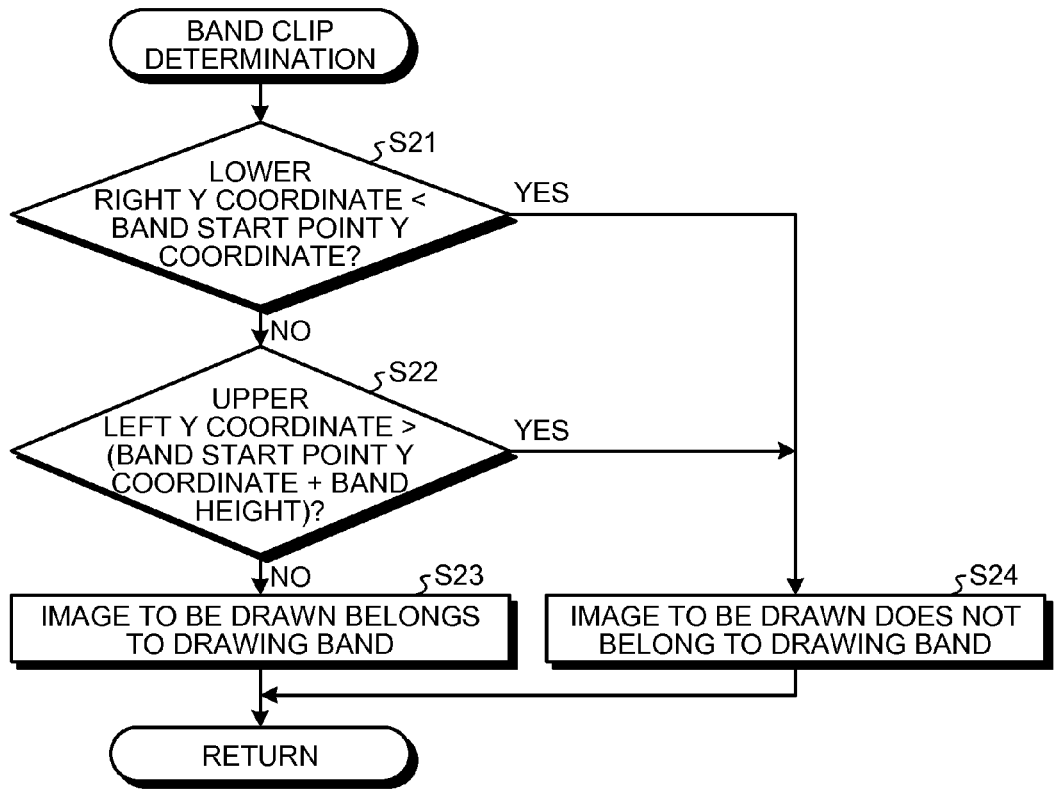
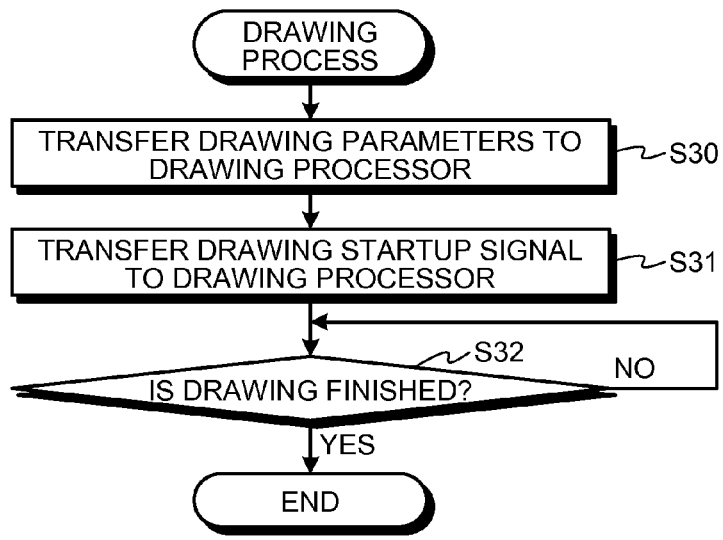

IMAGE PROCESSING APPARATUS, IMAGE PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2011-136771 filed in Japan on Jun. 20, 2011.

BACKGROUND OF THE INVENTION

1. Field of the Invention

The invention relates to an image processing apparatus, an image processing method, and a computer program.

2. Description of the Related Art

Conventionally, printers interpret and analyze page description language (PDL) received from a network and carry out drawing to a main memory using cyan-magenta-yellow-black (CMYK) data generated based on the result of the analysis. In recent years, there is a growing demand for an increase in resolution and the speed of processing. To meet such a demand, a technology in which a part of the process that has been performed by a central processing unit (CPU) is carried out by other hardware is known. For example, Japanese Patent No. 4490783 discloses a printer having a built-in hardware circuit (a drawing device) that executes a drawing process on a controller board connected to a printer engine.

Here, a drawing device that performs drawing in units of band having a predetermined area is assumed to execute drawing on a band 2 indicated in FIG. 14. The drawing device reads out drawing commands stored in a main memory and executes a drawing process in accordance with the drawing commands read out. FIG. 15 is a diagram illustrating an example of the drawing commands. In this example, the drawing device first reads out a band initialization command and specifies the band 2 on which the drawing is performed. The drawing device then reads out a halftone pattern (1) set command and reads out a halftone pattern (an image after a halftone process is performed) for a band 1 from the main memory. The drawing device then reads out a rectangle (1) drawing command giving instructions to draw a rectangle (1) indicated in FIG. 14. However, because the rectangle (1) does not belong to the band 2, the drawing process is not performed.

The drawing device then reads out a halftone pattern (2) set command and reads out the halftone pattern for the band 2 from the main memory. Subsequently, the drawing device reads out a rectangle (2) drawing command giving instructions to draw a rectangle (2) indicated in FIG. 14 and executes a drawing process of the rectangle (2). The drawing device then reads out a halftone pattern (3) set command and reads out the halftone pattern for a band 3 from the main memory. Then, the drawing device reads out a rectangle (3) drawing command for giving instructions to draw a rectangle (3) in FIG. 14. However, because the rectangle (3) does not belong to the band 2, the drawing process is not performed. The drawing device reads out a band end command thereafter and finishes the drawing process for the band 2.

In the above-described example, the drawing device reads out the halftone pattern each time the halftone pattern set command is read out, which makes it difficult to increase the speed of processing until drawing is completed.

There is a need to provide an image processing apparatus, an image processing method, and a computer program product that can achieve an increase in the speed of processing until drawing is completed.

SUMMARY OF THE INVENTION

It is an object of the present invention to at least partially solve the problems in the conventional technology.

An image processing apparatus draws an image in units of band having a predetermined area. The image processing apparatus includes: a first storage unit that stores therein a halftone pattern indicative of an image after a halftone process is performed; an analyzer that analyzes drawing commands, the drawing commands including a first command specifying a drawing band that is the band on which drawing is performed, a second command giving an instruction to read the halftone pattern, and a third command giving an instruction to execute drawing, so as to specify the drawing band and to determine whether an image to be drawn belongs to the drawing band; and a drawing processor that, when an image, drawing of which is instructed by the second command, is determined as not belonging to the drawing band, does not read the halftone pattern and does not draw that image; and that, when an image, drawing of which is instructed by the second command, is first determined as belonging to the drawing band, reads the halftone pattern specified by the first command from the first storage unit to draw that image using the halftone pattern read and does not read the halftone pattern in subsequent drawing to the drawing band.

An image processing method of drawing an image in units of band having a predetermined area, includes: a step of analyzing drawing commands, the drawing commands including a first command specifying a drawing band that is the band on which drawing is performed, a second command giving an instruction to read a halftone pattern, and a third command giving an instruction to execute drawing, so as to specify the drawing band and to determine whether an image to be drawn belongs to the drawing band; and a step of drawing process in which, when an image, drawing of which is instructed by the second command, is determined as not belonging to the drawing band, the halftone pattern is not read and that image is not drawn; and, when an image, drawing of which is instructed by the second command, is first determined as belonging to the drawing band, the halftone pattern specified by the first command is read from a first storage unit to draw that image using the halftone pattern read and the halftone pattern is not read in subsequent drawing to the drawing band.

A computer program product includes a non-transitory computer-usable medium having computer-readable program codes embodied in the medium. The program codes when executed causing a computer to execute an image processing method of drawing an image in units of band having a predetermined area. The image processing method includes: a step of analyzing drawing commands, the drawing commands including a first command specifying a drawing band that is the band on which drawing is performed, a second command giving an instruction to read a halftone pattern, and a third command giving an instruction to execute drawing, so as to specify the drawing band and to determine whether an image to be drawn belongs to the drawing band; and a step of drawing process in which, when an image, drawing of which is instructed by the second command, is determined as not belonging to the drawing band, the halftone pattern is not read and that image is not drawn; and, when an image, drawing of which is instructed by the second command, is first determined as belonging to the drawing band, the halftone pattern specified by the first command is read from a first storage unit to draw that image using the halftone pattern read and the halftone pattern is not read in subsequent drawing to the drawing band.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram illustrating an example of drawing commands;

FIG. 9 is a flowchart illustrating an example of a band clip determining process;

FIG. 10 is a flowchart illustrating an example of a drawing process;

DETAILED DESCRIPTION OF THE PREFERRED EMBODIMENTS

Figure 1:
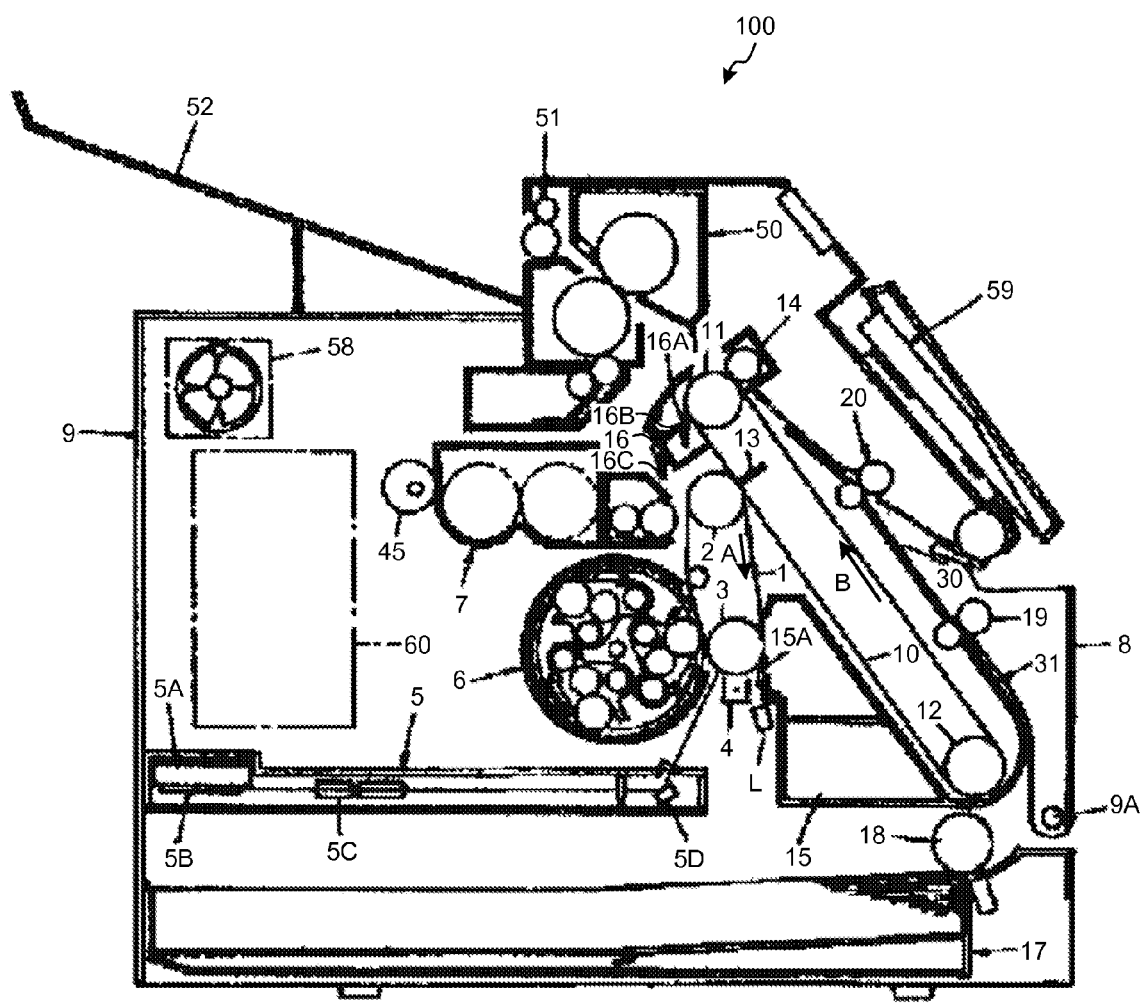
FIG. 1 is a diagram illustrating an example of a configuration of a mechanism of an image forming apparatus according to an embodiment.

With reference to the accompanying drawings, an image processing apparatus according to an embodiment of the invention will be described in detail hereinafter. FIG. 1 illustrates a configuration example of a mechanism of an image forming apparatus (a color printer) to which an image processing apparatus according to the invention is applicable. In the image forming apparatus 100, a photosensitive element 1 that is an image carrier in a belt form is rotatably supported by rotating rollers 2 and 3, and is rotated in an arrow A direction by the drive of each of the rotating rollers 2 and 3. On an outer circumference of the photosensitive element 1, a charging device 4 that is a charging unit, a neutralization lamp L, and a cleaning blade 15A for the photosensitive element 1 are disposed. At a position downstream of the charging device 4, a laser writing unit 5 that is an optical writing unit is disposed.

Above the laser writing unit 5, a multicolor developing unit 6 in which a plurality of developing units are supported to be switchable is disposed. The multicolor developing unit 6 is provided with a yellow developing unit, a magenta developing unit, and a cyan developing unit for the respective colors of toner housed. Above the multicolor developing unit 6, a black developing unit 7 housing black toner is provided.

One of the developing units moves to a position, at which developing can be performed, in synchronization with timing of development in corresponding color. The multicolor developing unit 6 has a function to select one of the developing units by circumferential rotation of 120 degrees. When any of these developing units operates, the black developing unit 7 is moved to a position away from the photosensitive element 1. Such a movement is caused by rotation of a cam 45.

The laser writing unit 5 generates in sequence laser beams corresponding to image forming signals (writing information) of a plurality of colors from a laser light source not depicted, and periodically deflects the laser beams using a polygon mirror 5B rotated by a polygon motor 5A to scan a charged surface of the photosensitive element 1 through an fθ lens 5C, a mirror 5D, etc. so as to form an electrostatic latent image on the surface.

The electrostatic latent image formed on the surface of the photosensitive element 1 is developed by the toner from the corresponding developing unit, and a toner image is formed and held thereon. An intermediate transfer belt 10 is disposed adjacent to the photosensitive element 1 and is supported by rotating rollers 11 and 12 to be rotatable in an arrow B direction. The toner image on the photosensitive element 1 is transferred on a surface of the intermediate transfer belt 10 by a transfer brush (a first transfer unit) 13 located on a back side of the intermediate transfer belt 10.

The surface of the photosensitive element 1 is cleaned by the cleaning blade 15A for each of the colors, and a toner image of a given color is formed on the surface. Each time a toner image is formed, the toner image on the photosensitive element 1 is transferred to the same position on the surface of the intermediate transfer belt 10 for each rotation thereof, and the toner images of the plurality of colors are held on the intermediate transfer belt 10 overlapping one another. Thereafter, the toner images are transferred onto a recording medium such as a sheet of paper or plastic.

When transferring the toner images to a sheet, a sheet housed in a feeding device (a paper cassette) 17 is let out by a paper feeding roller 18 and is conveyed by a conveying roller 19. After being temporarily stopped with abutting a pair of registration rollers 20, the sheet is conveyed again to a nip between the intermediate transfer belt 10 and a transfer roller (a second transfer unit) 14 being timed to regulate transfer positions of the toner images.

The toner images of the multiple colors on the intermediate transfer belt 10 are collectively transferred on the sheet by the operation of the transfer roller 14, and the sheet is then conveyed to a fixing device 50. After the toner image is fixed by the fixing device 50, the sheet is discharged to a discharging stack unit 52 located above a body frame 9 by a pair of discharging rollers 51.

On the intermediate transfer belt 10, a cleaning device 16 for the intermediate transfer belt 10 is provided at a position of the rotating roller 11, and a cleaning blade 16A thereof is configured to contact with and separate from the intermediate transfer belt 10 via a cleaning blade contacting and separating arm 16C. The cleaning blade 16A is configured to separate from the intermediate transfer belt 10 during a process of receiving the toner images from the photosensitive element 1 and to contact with the intermediate transfer belt 10 after the toner images are transferred onto a sheet from the intermediate transfer belt 10 so as to scrape off residual toner thereon after the toner images are transferred to the sheet.

As described in the foregoing, there are cleaning blades for the photosensitive element 1 and for the intermediate transfer belt 10. Waste toner scraped off by these cleaning blades is stored in a collection container 15. The collection container 15 is appropriately replaced. An auger 16B provided inside the cleaning device 16 for the intermediate transfer belt 10 conveys the waste toner scraped off by the cleaning blade 16A and forwards it to the collection container 15 by a conveying unit not depicted.

The photosensitive element 1, the charging device 4, the intermediate transfer belt 10, the cleaning device 16, and a conveying guide 30 forming a sheet conveying path are integrally incorporated into a process cartridge 31 in a unit form, and the process cartridge 31 is configured to be replaced when it comes to the end of its life. Other than replacing the process cartridge 31, the multicolor developing unit 6, the black developing unit 7, and others are also replaced when they reach the end of their lives. To make it easy to replace the foregoing units and to handle jammed paper, a front frame 8 that is a part of a main body is constructed to rotate about a shaft 9A to be opened and closed.

In the left part of FIG. 1, a controller board 60 is housed. Above the controller board 60, a fan 58 is provided to exhaust air to prevent internal temperature from rising excessively. In the right part of FIG. 1, another relatively small feeding device 59 is provided. While the intermediate transfer belt 10 is used as an intermediate transfer body in the present embodiment, an intermediate drum can also be used.

Figure 2:
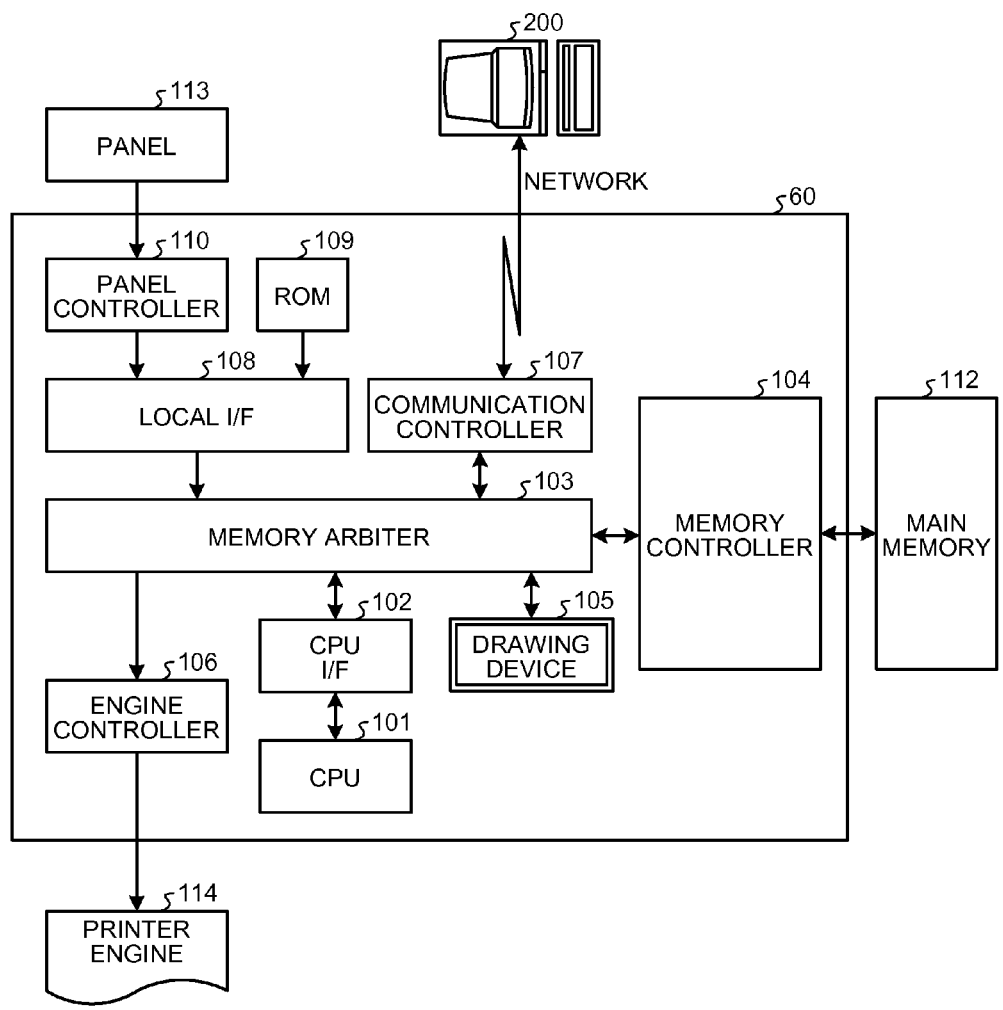
FIG. 2 is a block diagram illustrating an example of a configuration of an electrical controller in the image forming apparatus.

FIG. 2 is a block diagram illustrating an example of a hardware configuration of an electrical controller of the image forming apparatus 100. In the electrical controller in FIG. 2, the controller board 60 is connected with a personal computer (hereinafter, referred to as a PC) 200 via a network. The printer controller board 60 includes a CPU 101, a CPU I/F 102, a memory arbiter 103, a memory controller 104, a drawing device 105 constructed by a hardware circuit, an engine controller 106, a communication controller 107, a local I/F 108, a ROM 109, and a panel controller 110.

The CPU 101 controls the whole of the image forming apparatus 100. The CPU 101 further analyzes page description language (PDL) transmitted from the PC 200 to conduct a process such as generation of drawing commands and information necessary for image processing. While the PDL is exemplified here as an example of image drawing instruction data that is described in a given language and gives instructions to draw an image, it is not restricted to this. The CPU I/F 102 is an interface of the CPU 101 and is connected with a main memory 112, other controllers, etc. via the memory arbiter 103. The main memory 112 stores therein such as PDL, various types of data obtained by analyzing the PDL, halftone-processed image data (halftone patterns) that is data of images included in the PDL (image data obtained by analyzing the PDL) on which a given halftone process is performed, and computer a program executed by the CPU 101.

The memory arbiter 103 carries out arbitration between the memory controller 104 and the various controllers. The memory controller 104 controls the main memory 112 and is connected with the various controllers and the CPU 101 via the memory arbiter 103.

The drawing device 105 reads and analyzes the drawing commands generated by the CPU 101, and executes a drawing process in units of band in accordance with the analyzed commands. The drawing device 105 then writes the drawn band image into a band memory area of the main memory 112. The engine controller 106 controls a printer engine 114. The printer engine 114 forms an image on a medium under the control of the engine controller 106. The PC 200 creates PDL for an image to be output by the printer engine 114 and outputs the PDL to the image forming apparatus 100 via the network.

The communication controller 107 is connected to the network and receives data, commands, and others sent from the PC 200 and the like connected via the network. The communication controller 107 further outputs the received data and the like to the controllers connected via the memory arbiter 103 and sends data input from the controllers to the PC 200 and the like.

The ROM 109 stores therein a computer program executed by the CPU 101, font information for characters, and others. The ROM 109 is connected with the memory arbiter 103 via the local I/F 108. The panel controller 110 controls a panel 113 for operation. The panel controller 110 is connected with the memory arbiter 103 via the local I/F 108. The panel 113 displays status of the image forming apparatus 100, and further receives operation input to the image forming apparatus 100 from a user.

Figure 3:
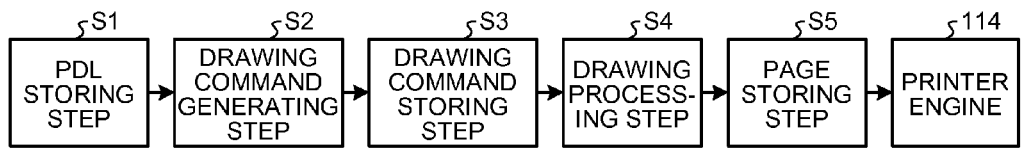
FIG. 3 is a flowchart illustrating in outline an example of processes performed in the image forming apparatus.

FIG. 3 is a flow diagram illustrating in outline an example of a process performed in the image forming apparatus 100. At PDL storing Step S1, PDL received from the PC 200 is stored in the main memory 112. At the following drawing command generating Step S2, the CPU 101 reads out and analyzes the PDL stored in the main memory 112 and generates drawing commands. The CPU 101 further executes a halftone process on an image obtained by analyzing the PDL and writes the halftone-processed image data (halftone patterns) to a given area (a halftone pattern storage area) of the main memory 112. At the following drawing command storing Step S3, the CPU 101 writes the generated drawing commands to a given area of the main memory 112. At the following drawing processing Step S4, the drawing device 105 reads out the drawing commands stored in the main memory 112 and executes drawing of images in units of band in accordance with the drawing commands read out. The CPU 101 writes the drawn band images to the main memory, and the band images for one page are stored in the main memory 112 (at the following page storing Step S5). The printer engine 114 then reads out the image data for one page drawn by the drawing device 105 from the main memory 112 and prints to output.

Figure 4:
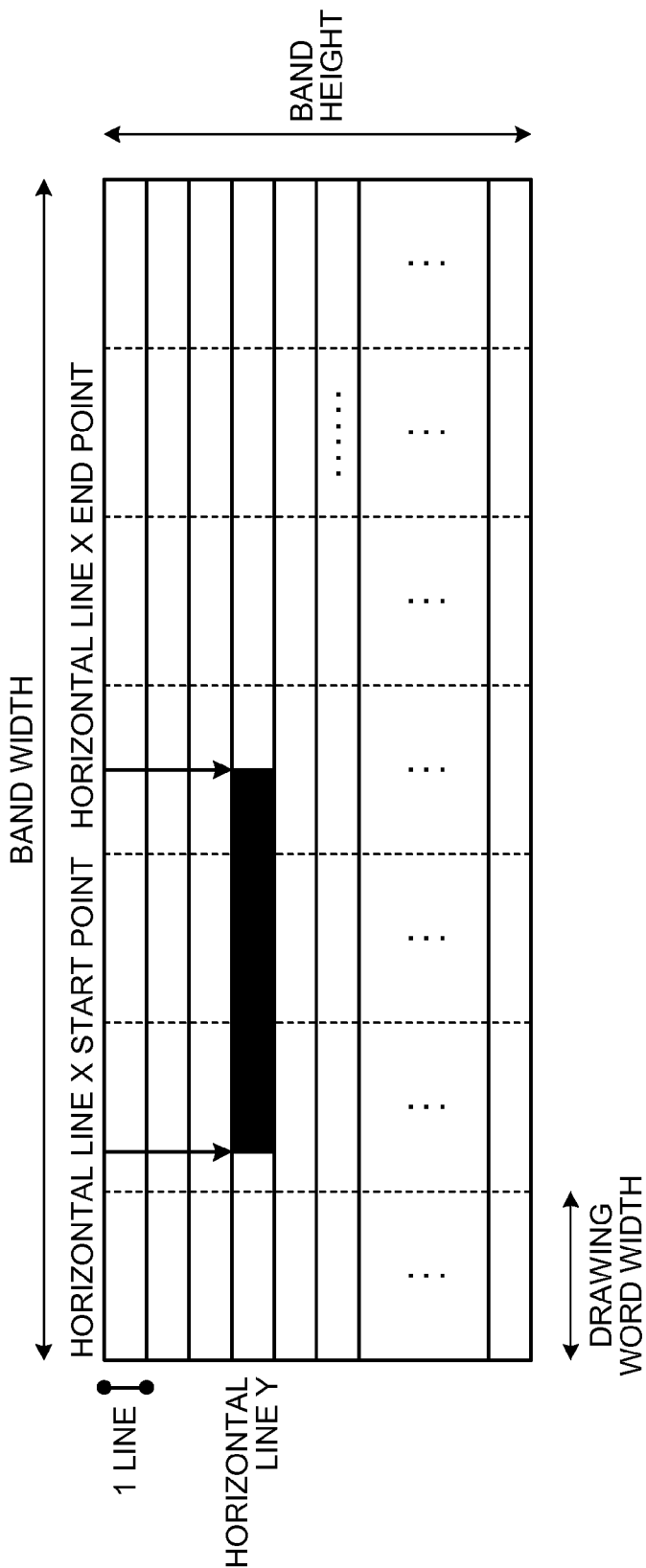
FIG. 4 is a diagram illustrating examples of a format of a band memory area and a drawing.

FIG. 4 illustrates an example of a format of and drawing to the band memory area that is an area of the main memory 112 in which band images are stored. A drawing word width is a width of a word, in units of which the drawing device 105 accesses the band memory. As a drawing example, illustrated here is an example in which a horizontal line is drawn from a horizontal line X start point to a horizontal line X end point with respect to a horizontal line Y.

Figure 14:
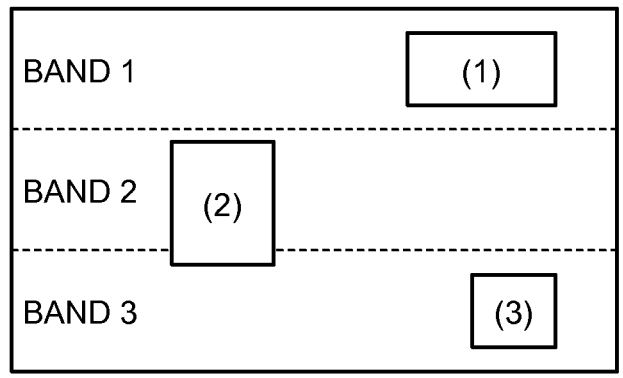
FIG. 14 is a diagram for explaining an example of drawing by a conventional configuration.
Figure 15:
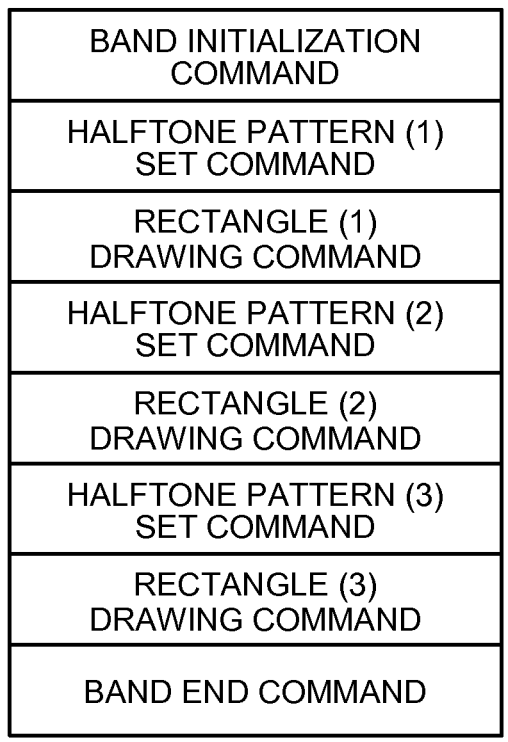
FIG. 15 is a diagram illustrating an example of the drawing commands.

FIG. 5 is a diagram illustrating an example of drawing commands when the drawing in FIG. 14 is carried out, and FIGS. 6A to 6E are diagrams each illustrating a format example of a command included in the drawing commands. In the example in FIG. 5, the drawing commands are read out in order of a band initialization command, a halftone pattern (1) set command, a rectangle (1) drawing command, a halftone pattern (2) set command, a rectangle (2) drawing command, a halftone pattern (3) set command, a rectangle (3) drawing command, and a band end command.

Figure 6A:
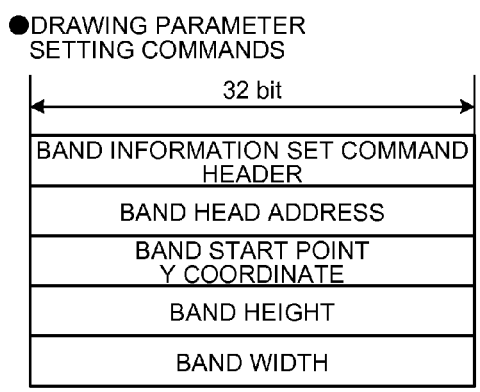
FIGS. 6A to 6E are diagrams each illustrating a format example of a command included in the drawing commands.
Figure 6B:
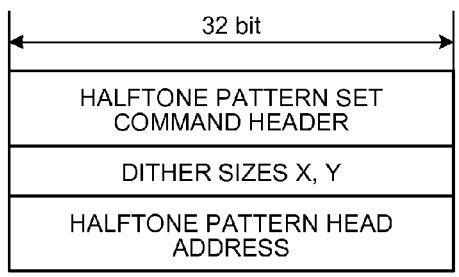

The band initialization command is a leading command of the drawing commands and is a command to specify a drawing band that is a band where drawing is performed. As illustrated in FIG. 6A, a head address of a drawing band, a Y coordinate of a start point at the upper left of the drawing band, a height of the drawing band, and a width of the drawing band are set in the band initialization command. The halftone pattern set command is a command to specify a halftone pattern corresponding to each band. In the example in FIG. 5, a command specifying a halftone pattern corresponding to a band x is represented as a halftone pattern (x) set command. As illustrated in FIG. 6B, sizes of dither in the X direction and in the Y direction, and a halftone head address to specify a storage position of the halftone pattern in the main memory 112 are set in the halftone pattern set command. The band end command is a trailing command of the drawing commands and is a command indicative of the end of drawing. In the example in FIG. 6E, the band end command is composed of an end command header in 32 bits.

Figure 6C:
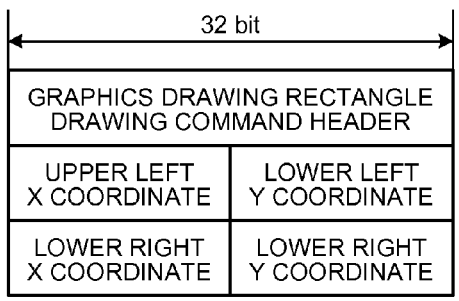
Figure 6D:
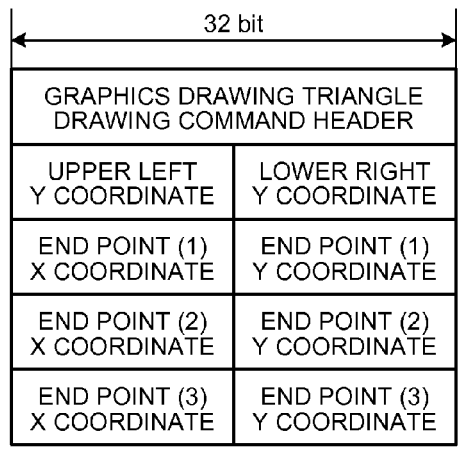
Figure 6E:
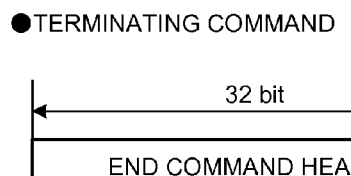

The rectangle drawing command is a command giving instructions to draw a rectangle, and a command header and coordinates of each vertex of the rectangle are set in the rectangle drawing command as illustrated in FIG. 6C. While not illustrated in FIG. 5, a triangle drawing command giving instructions to draw a triangle can be included in the drawing commands. As illustrated in FIG. 6D, a command header and coordinates of each vertex of the triangle are set in the triangle drawing command.

The drawing commands in the foregoing can be classified into a drawing parameter setting command to set various parameters to perform drawing, a drawing execution command to execute drawing, and a terminating command. The band initialization command and the halftone pattern set command are classified as the drawing parameter setting command, the rectangle drawing command and the triangle drawing command are classified as the drawing execution command, and the band end command is classified as the terminating command.

Figure 7:
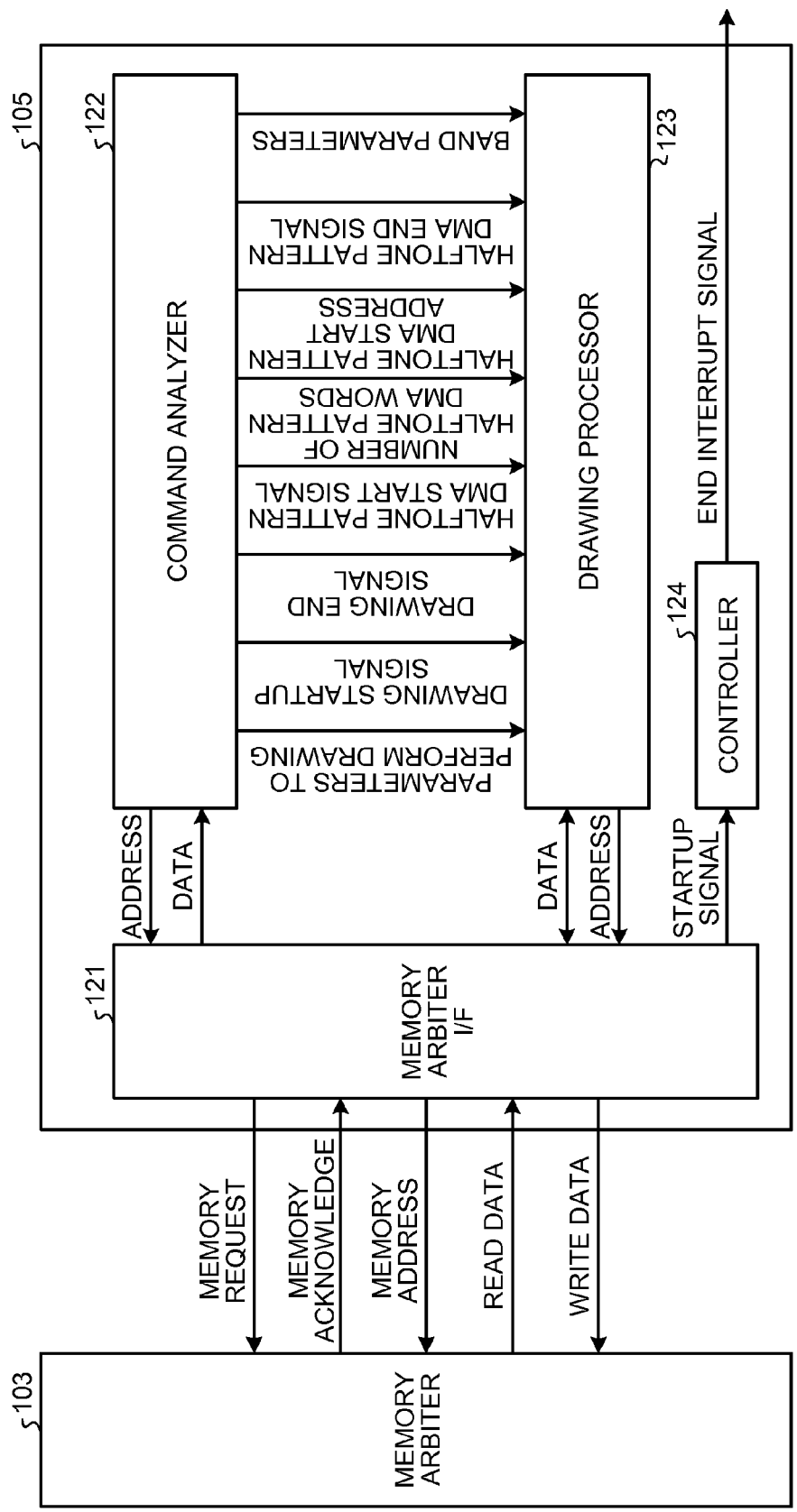
FIG. 7 is a block diagram illustrating an example of a configuration of a drawing device.

FIG. 7 is a block diagram illustrating a configuration example of the drawing device 105. The drawing device 105 includes a memory arbiter I/F 121, a command analyzer 122, a drawing processor 123, and a controller 124. The memory arbiter I/F 121 is an interface unit to connect the command analyzer 122 and the drawing processor 123 with the memory arbiter 103.

The command analyzer 122 reads out the drawing commands stored in the main memory 112 and analyzes the drawing commands read out. When the command read out is the drawing parameter setting command, the command analyzer 122 transfers various parameters specified by the command to the drawing processor 123, and then reads out a subsequent command from the main memory 112. Meanwhile, when the command read out is a drawing execution command, the command analyzer 122 transfers various parameters specified by the command to the drawing processor 123, and then transfers a drawing startup signal to the drawing processor 123. Thereafter, when the command analyzer 122 receives a drawing end signal from the drawing processor 123, the command analyzer 122 reads out a subsequent drawing command from the main memory 112. When the command analyzer 122 reads out the band initialization command that is a leading command of the drawing commands, the command analyzer 122 transfers band parameters specified by the band initialization command (for example, a band head address, a band start point Y coordinate, a band height, a band width, etc.) to the drawing processor 123, and then reads out a subsequent command from the main memory 112.

When the drawing processor 123 receives the various parameters (drawing parameters to perform drawing) from the command analyzer 122, and then receives the drawing startup signal from the command analyzer 122, the drawing processor 123 executes a drawing process. When the drawing processor 123 finishes the drawing process, the drawing processor 123 transfers the end signal indicative of completion of the drawing process to the command analyzer 122. The detailed configuration of the drawing processor 123 will be described later. The controller 124 is a unit that controls the whole of the drawing device 105.

Figure 8:
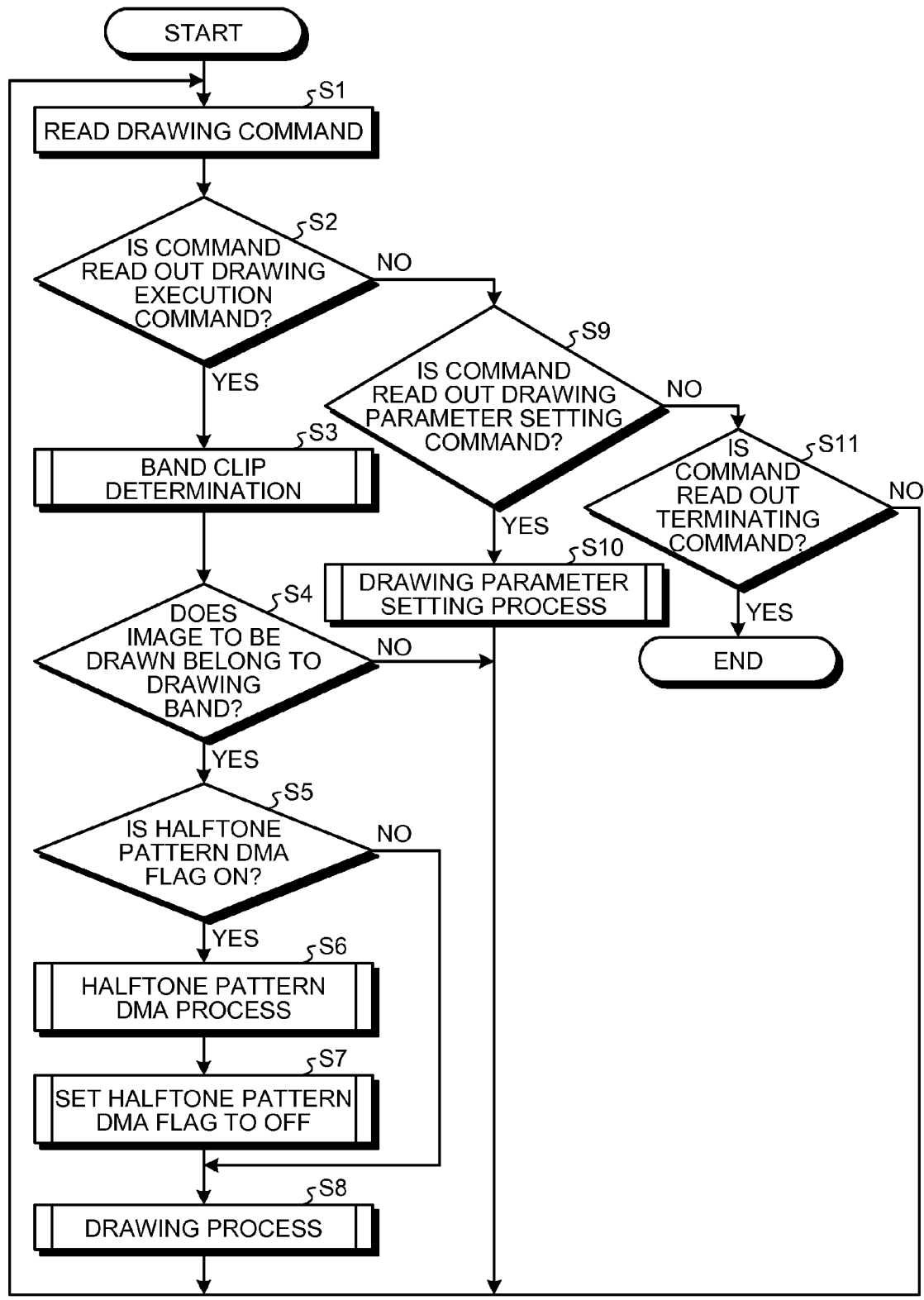
FIG. 8 is a flowchart illustrating an example of processing operation performed by the drawing device.

FIG. 8 is a flowchart illustrating an example of processing operation by the drawing device 105. As illustrated in FIG. 8, the command analyzer 122 first reads out a drawing command stored in the main memory 112 (Step S1). The command analyzer 122 then analyzes the command read out and determines whether the command read out is a drawing execution command (Step S2). When determining that the command read out is a drawing execution command (the result at Step S2 is Yes), the command analyzer 122 executes a band clip determining process that determines whether an image to be drawn belongs to a band specified by the band initialization command (a drawing band) (Step S3).

FIG. 9 is a flowchart illustrating an example of the band clip determining process. Here, it is assumed that a rectangle drawing command is read out as the drawing execution command. As illustrated in FIG. 9, the command analyzer 122 first determines whether a value of the Y coordinate at the lower right of a rectangle instructed to be drawn is smaller than a value of the band start point Y coordinate specified by the band initialization command (Step S21). When determining that the value of the Y coordinate at the lower right of the rectangle instructed to be drawn is larger than the value of the band start point Y coordinate specified by the band initialization command (the result at Step S21 is No), the command analyzer 122 determines whether a value of the Y coordinate at the upper left of the rectangle instructed to be drawn is larger than a sum of the value of the band start point Y coordinate and the band height (Step S22). When determining that the value of the Y coordinate at the upper left of the rectangle instructed to be drawn is smaller than the sum of the band start point Y coordinate value and the band height (the result at Step S22 is No), the command analyzer 122 determines that the rectangle instructed to be drawn (the image to be drawn) belongs to the drawing band (Step S23). On the other hand, when determining that the value of the Y coordinate at the lower right of the rectangle instructed to be drawn is smaller than the value of the band start point Y coordinate specified by the band initialization command (the result at Step S21 is Yes), or when determining that the value of the Y coordinate at the upper left of the rectangle instructed to be drawn is larger than the sum of the band start point Y coordinate value and the band height (the result at Step S22 is Yes), the command analyzer 122 determines that the image to be drawn does not belong to the drawing band (Step S24).

The explanation is continued by referring back to FIG. 8. As a result of the above-described band clip determining process, when it is determined that the image to be drawn belongs to the drawing band (the result at Step S4 is Yes), the process is shifted to Step S5. At Step S5, the command analyzer 122 determines whether a halftone pattern DMA flag is set to on. When determining that the halftone pattern DMA flag is set to on (the result at Step S5 is Yes), the command analyzer 122 transfers a halftone pattern DMA start signal to the drawing processor 123. Upon receiving the halftone pattern DMA start signal, the drawing processor 123 executes a halftone pattern DMA process (Step S6). More specifically, the drawing processor 123 reads out a halftone pattern specified by a halftone pattern head address set by a halftone pattern set command from the main memory 112. When the halftone pattern DMA process is finished, the drawing processor 123 transfers a halftone pattern DMA end signal indicative of completion of the halftone pattern DMA process to the command analyzer 122. Upon receiving the halftone pattern DMA end signal, the command analyzer 122 sets the halftone pattern DMA flag to off (Step S7). The process is then shifted to Step S8, and a drawing process is performed. Meanwhile, when it is determined that the halftone pattern DMA flag is set to off at the above-described Step S5 (the result at Step S5 is No), the process is shifted to Step S8 and a drawing process is performed.

FIG. 10 is a flowchart illustrating an example of the drawing process. As illustrated in FIG. 10, the command analyzer 122 first transfers the drawing parameters specified by the command read out to the drawing processor 123 (Step S30). The command analyzer 122 then transfers the drawing startup signal to the drawing processor 123 (Step S31). The drawing processor 123 starts drawing upon receiving the drawing startup signal, and when the drawing is finished (the result at Step S32 is Yes), the drawing process is finished.

The explanation is continued by referring back to FIG. 8 again. At the above-described Step S2, when determining that the command read out is not a drawing execution command (the result at Step S2 is No), the command analyzer 122 determines whether the command read out is a drawing parameter set command (Step S9). When determining that the command read out is a drawing parameter set command (the result at Step S9 is Yes), the command analyzer 122 executes a drawing parameter setting process (Step S10).

Figure 11:
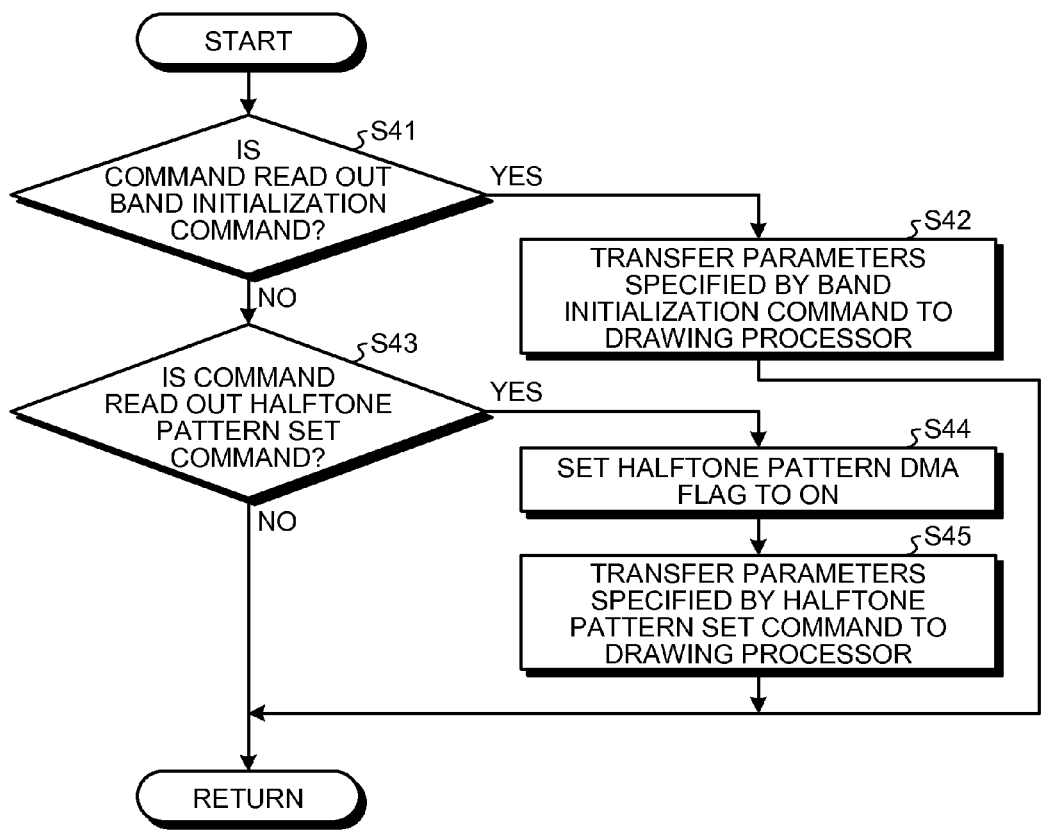
FIG. 11 is a flowchart illustrating an example of a drawing parameter setting process.

FIG. 11 is a flowchart illustrating an example of the drawing parameter setting process. As illustrated in FIG. 11, the command analyzer 122 first determines whether the command read out is the band initialization command (Step S41). When determining that the command read out is a band initialization command (the result at Step S41 is Yes), the command analyzer 122 transfers the parameters specified by the band initialization command (band parameters) to the drawing processor 123 (Step S42). More specifically, the command analyzer 122 writes the band parameters to a band parameter storage unit in the drawing processor 123.

In contrast, when determining that the command read out is not the band initialization command (the result at Step S41 is No), the command analyzer 122 determines whether the command read out is the halftone pattern set command (Step S43). When determining that the command read out is the halftone pattern set command (the result at Step S43 is Yes), the command analyzer 122 sets the halftone pattern DMA flag to on (Step S44). The command analyzer 122 then transfers the parameters specified by the halftone pattern set command to the drawing processor 123 (Step S45). More specifically, the command analyzer 122 writes a dither size (sizes in the X direction and the Y direction) specified by the halftone pattern set command to a drawing parameter storage unit in the drawing processor 123. The command analyzer 122 further obtains a DMA word size and transfers a DMA start address to a DMA address generator in the drawing processor 123.

The explanation is continued by referring back to FIG. 8 again. At the above-described Step S9, when determining that the command read out is not the drawing parameter set command (the result at Step S9 is No), the command analyzer 122 determines whether the command read out is the terminating command (the band end command) (Step S11). When the command analyzer 122 determines that the command read out is the terminating command (the result at Step S11 is Yes), the process is finished.

Figure 12:
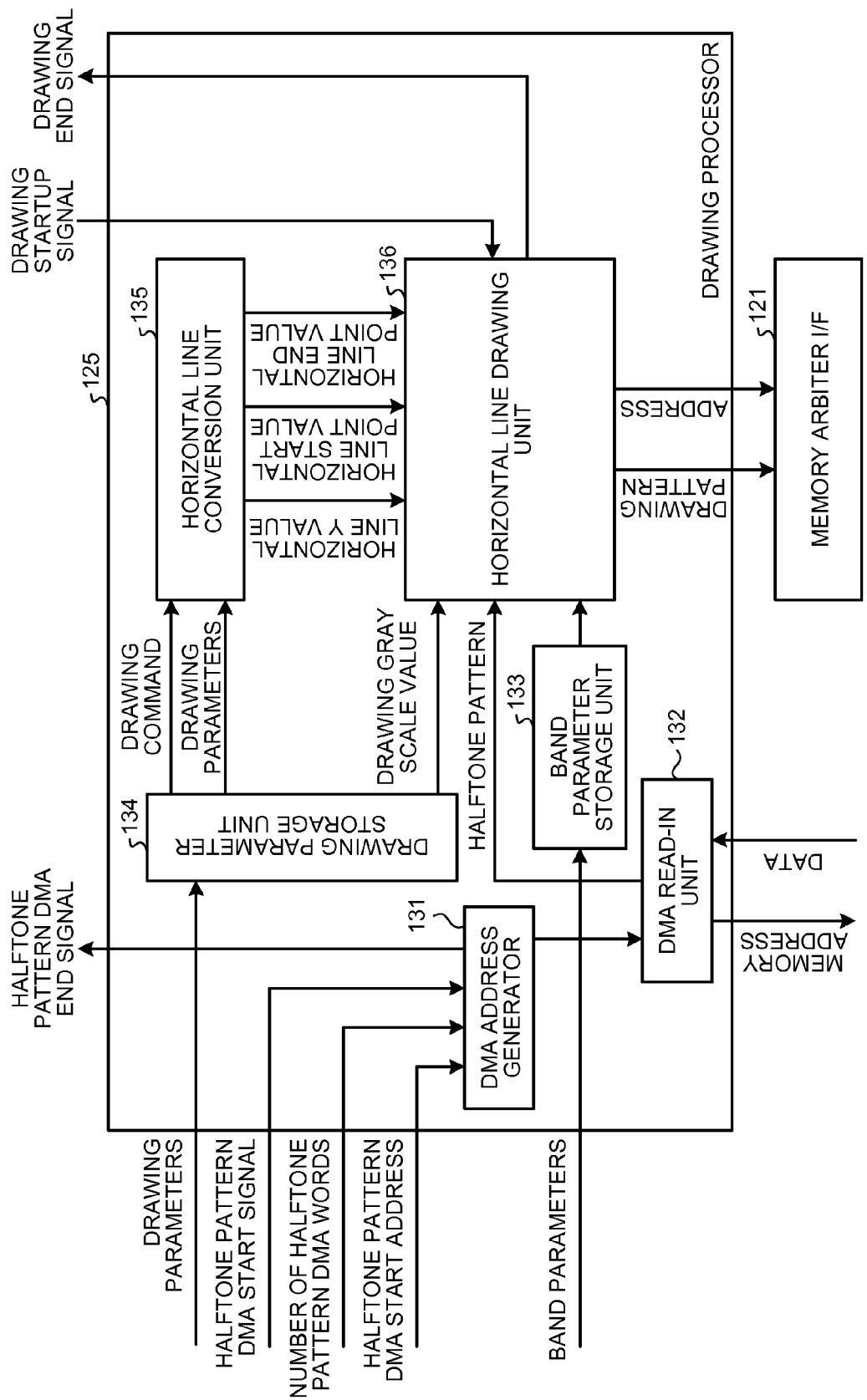
FIG. 12 is a block diagram illustrating an example of a configuration of a drawing processor.

FIG. 12 is a block diagram illustrating a configuration example of the drawing processor 123. As illustrated in FIG. 12, the drawing processor 123 includes a DMA address generator 131, a DMA read-in unit 132, the band parameter storage unit 133, the drawing parameter storage unit 134, a horizontal line conversion unit 135, and a horizontal line drawing unit 136.

The DMA address generator 131 receives the halftone pattern DMA start signal, number of DMA words, and the DMA start address from the command analyzer 122, generates a DMA address, and transfers the DMA address to the DMA read-in unit 132. Upon receiving the DMA address from the DMA address generator 131, the DMA read-in unit 132 accesses the main memory 112 via the memory arbiter I/F 121 in FIG. 7 to read out a halftone pattern stored in an area of the main memory 112 specified by the DMA address and transfers the halftone pattern to the horizontal line drawing unit 136. The band parameter storage unit 133 stores therein the band parameters transferred from the command analyzer 122. The drawing parameter storage unit 134 stores therein the drawing parameters transferred from the command analyzer 122. The horizontal line conversion unit 135 reads out the drawing parameters stored in the drawing parameter storage unit 134 and converts the drawing parameters read out into horizontal line data. The horizontal line data include a horizontal line Y value, a horizontal line X start point value, and a horizontal line X end point value. The horizontal line drawing unit 136 performs drawing to the band memory area in the main memory 112 via the memory arbiter I/F 121 in FIG. 7 based on the horizontal line data from the horizontal line conversion unit 135.

Figure 13:
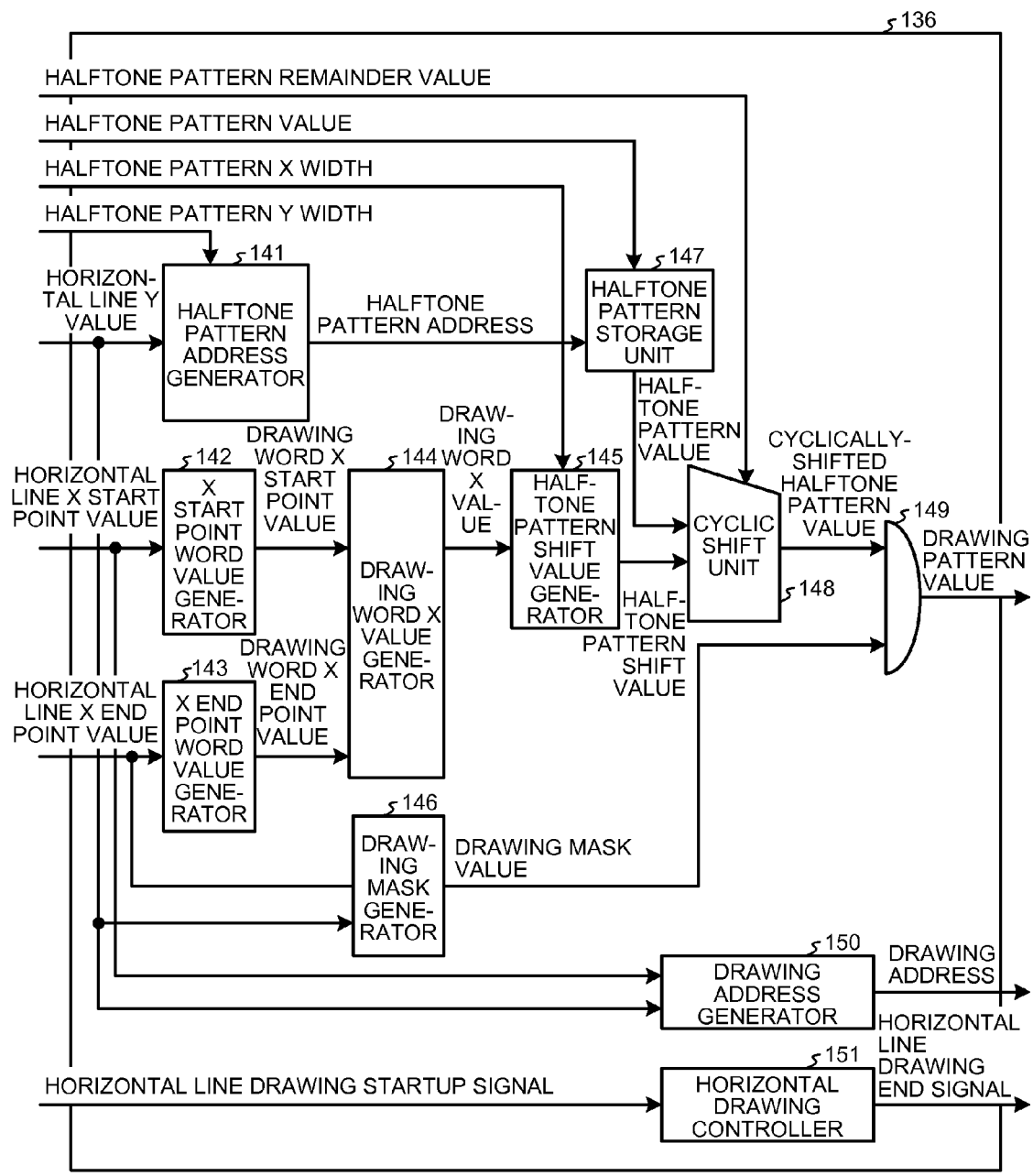
FIG. 13 is a block diagram illustrating an example of a configuration of a horizontal line drawing unit.

FIG. 13 is a block diagram illustrating a configuration example of the horizontal line drawing unit 136. As illustrated in FIG. 13, the horizontal line drawing unit 136 includes a halftone pattern address generator 141, an X start point word value generator 142, an X end point word value generator 143, a drawing word X value generator 144, a halftone pattern shift value generator 145, a drawing mask generator 146, a halftone pattern storage unit 147, a cyclic shift unit 148, a logic operation unit 149, a drawing address generator 150, and a horizontal drawing controller 151.

The halftone pattern address generator 141 performs, with the horizontal line Y value transferred from the horizontal line conversion unit 135 and a width of the halftone pattern read by the DMA read-in unit 132 in the Y direction (Y width), a modulo operation of the horizontal line Y value-MOD-the halftone pattern Y width to obtain a Y value in the halftone pattern that is a remainder of the division, and transfers the Y value to the halftone pattern storage unit 147 as a halftone pattern address.

The X start point word value generator 142 obtains a drawing word X start point value in units of drawing word from the horizontal line X start point value transferred from the horizontal line conversion unit 135, and transfers the drawing word X start point value to the drawing word X value generator 144. The X end point word value generator 143 obtains a drawing word X end point value in units of drawing word from the horizontal line X end point value transferred from the horizontal line conversion unit 135, and transfers the drawing word X end point value to the drawing word X value generator 144. The drawing word X value generator 144 generates a drawing word X value from the X start point value to the X end point value in units of drawing word, and transfers the drawing word X value to the halftone pattern shift value generator 145.

The halftone pattern shift value generator 145 performs, with the drawing word X value transferred from the drawing word X value generator 144 and a width of the halftone pattern read by the DMA read-in unit 132 in the X direction (X width), a modulo operation of the drawing word X value-MOD-the halftone pattern X width to obtain an X value in the halftone pattern that is a remainder of the division, and transfers the X value to the cyclic shift unit 148 as a halftone pattern shift value. The drawing mask generator 146 generates a drawing mask from an X start point to an X end point for each drawing word from the horizontal line X start point value and the horizontal line X end point value transferred from the horizontal line conversion unit 135, and transfers the drawing mask to the logic operation unit 149.

The halftone pattern storage unit 147 is a storage unit that stores therein horizontal lines of drawing words of the halftone pattern, number of the horizontal lines corresponding to the Y width of the halftone pattern, and transfers halftone pattern value accessed based on the halftone pattern address from the halftone pattern address generator 141 to the cyclic shift unit 148.

The cyclic shift unit 148 receives the halftone pattern value from the halftone pattern storage unit 147, the halftone pattern shift value from the halftone pattern shift value generator 145, and a halftone pattern remainder value from the drawing parameter storage unit 134, cyclically shifts the halftone pattern value, and transfers the cyclically-shifted halftone pattern value to the logic operation unit 149. The logic operation unit 149 is composed of an AND circuit, performs a logical product of the cyclically-shifted halftone pattern value from the cyclic shift unit 148 and the drawing mask from the drawing mask generator 146 to generate a drawing pattern value, and transfers the drawing pattern value generated to the memory arbiter I/F 121.

The drawing address generator 150 generates a drawing address that is an address, at which drawing to the band memory of the main memory 112 is performed, based on the horizontal line Y value and the horizontal line X start point value from the horizontal line conversion unit 135, and transfers the drawing address to the memory arbiter I/F 121. The horizontal drawing controller 151 controls the whole of the horizontal line drawing unit 136.

As described in the foregoing, in the present embodiment, a halftone pattern is read out only when an image to be drawn belongs to a drawing band, while no halftone pattern is read out when an image to be drawn does not belong to the drawing band. As a consequence, the present embodiment has an advantageous effect of achieving an increase in the speed of processing until drawing is completed.

Figure 16:
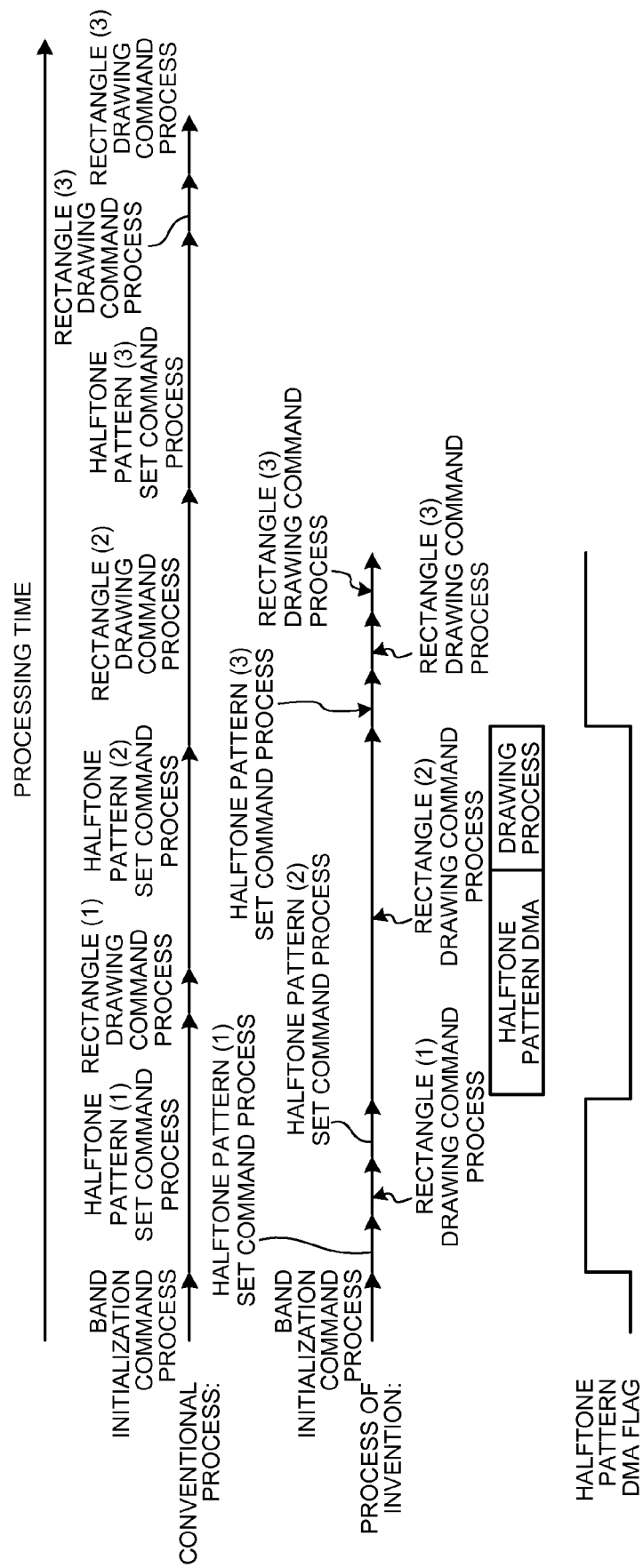
FIG. 16 is a diagram for explaining an effect by the embodiment.

For example, a situation of drawing to the band 2 indicated in FIG. 14 will be explained. As illustrated in FIG. 16, in a conventional configuration, because a halftone pattern is read out each time a halftone pattern set command is read out, the processing time until the drawing to the band 2 is completed becomes long, which makes it difficult to achieve an increase in the speed of processing. In contrast, in the present embodiment, when an image, drawing of which is instructed by the drawing execution command, does not belong to the drawing band, the halftone pattern DMA is not performed even when the halftone pattern set command is received. The halftone pattern DMA is performed only when an image, drawing of which is instructed by the drawing execution command, is first determined as belonging to the drawing band, and the halftone pattern DMA is not performed in subsequent drawing to the drawing band. In the present embodiment, the halftone pattern DMA flag is used, and the halftone pattern DMA flag is set to on when the halftone pattern set command is received and is set to off at the time the image first determined as belonging to the drawing band is drawn. To conduct a drawing process, if the halftone pattern DMA flag is on, the drawing process is carried out after the halftone pattern DMA is performed. If the halftone pattern DMA flag is off, the drawing process is carried out without performing the halftone pattern DMA. Consequently, in the present embodiment, a useless halftone pattern DMA is not performed, whereby the drawing process can be performed fast.

While the exemplary embodiment of the present invention is described in the foregoing, the invention is not restricted to the above-described embodiment, and various modifications can be made in the invention without departing from the spirit and scope of the invention. Furthermore, the program that realizes the above-described various processes executed by the image forming apparatus 100 in the present embodiment is configured to be provided being embedded in a ROM or the like in advance. However, the program can be provided in a file of an installable format or an executable format recorded on a computer readable recording medium such as a CD-ROM, a flexible disk (FD), a CD-R, a digital versatile disk (DVD), or various types of memory cards.

The program executed by the image forming apparatus in the embodiment may be configured to be stored on a computer connected to a network such as the Internet and to be downloaded via the network.

While the invention is exemplified to be applied to a printer in the above-described embodiment, it is merely an example and the invention is not restricted to this example. In other words, the invention can be applied to any image forming apparatus such as a copying machine, a printer, a scanner, and a facsimile machine.

The embodiment provides an advantageous effect that can reduce time of processing required to complete drawing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus that draws an image in units of band having an area, the image processing apparatus comprising:
    a first storage unit that stores therein a halftone pattern indicative of an image after a halftone process is performed;
    a drawing processor configured to read a halftone pattern from the first storage unit to draw a part of the image using the halftone pattern, if the drawing processor receives an instruction to read the halftone pattern; and
    an analyzer configured to,
        determine, based on drawing commands, whether to transmit the instruction to the drawing processor to read the halftone pattern and execute drawing by,
            first determining if the image belongs to the drawing band; and
            second determining if a flag indicates that the drawing processor has not read the halftone pattern for the drawing band,
        instruct the drawing processor to read the halftone pattern only if the first determining determines that the image belongs to the drawing band and the second determining determines that the flag indicates that the drawing processor has not read the halftone pattern for the drawing band, and
        instruct the drawing processor to execute the drawing if the first determining determines that the image belongs to the drawing band such that the drawing processor executes the drawing of the band without reading the halftone pattern associated with the band if the flag indicates that the drawing processor has read the halftone pattern for the drawing band.

2. The image processing apparatus according to claim 1, further comprising:
a receiver that receives image drawing instruction data, which is described in a given language and gives an instruction to draw the image, from a host device;
a drawing command generator that interprets the image drawing instruction data to generate the drawing commands; and
a second storage unit that stores therein the drawing commands, wherein
the analyzer reads out and analyzes the drawing commands stored in the second storage unit.

3. An image processing method of drawing an image in units of band having an area, the image processing method comprising:
reading, via a drawing processor, a halftone pattern from a first storage unit to draw a part of the image using the halftone pattern, if the drawing processor receives an instruction to read the halftone pattern;
determining, via a analyzer, whether to transmit the instruction to the drawing processor to read the halftone pattern and execute drawing based on drawing commands by,
first determining if the image belongs to the drawing band, and
second determining if a flag indicates that the drawing processor has not read the halftone pattern for the drawing band,
instructing the drawing processor to read the halftone pattern only if the first determining determines that the image belongs to the drawing band and the second determining determines that the flag indicates that the drawing processor has not read the halftone pattern for the drawing band; and
instructing the drawing processor to execute the drawing if the first determining determines that the image belongs to the drawing band such that the drawing processor executes the drawing of the band without reading the halftone pattern associated with the band if the flag indicates that the drawing processor has read the halftone pattern for the drawing band.

4. A computer program product comprising:
a non-transitory computer-usable medium having computer-readable program codes embodied in the medium, wherein the program codes when executed causing a computer to execute an image processing method of drawing an image in units of band having an area, the image processing method including,
reading, via a drawing processor, a halftone pattern from a first storage unit to draw a part of the image using the halftone pattern, if the drawing processor receives an instruction to read the halftone pattern;
determining, via a analyzer, whether to transmit the instruction to the drawing processor to read the halftone pattern and execute drawing based on drawing commands by,
first determining if the image belongs to the drawing band, and
second determining if a flag indicates that the drawing processor has not read the halftone pattern for the drawing band,
instructing the drawing processor to read the halftone pattern only if the first determining determines that the image belongs to the drawing band and the second determining determines that the flag indicates that the drawing processor has not read the halftone pattern for the drawing band; and
instructing the drawing processor to execute the drawing if the first determining determines that the image belongs to the drawing band such that the drawing processor executes the drawing of the band without reading the halftone pattern associated with the band if the flag indicates that the drawing processor has read the halftone pattern for the drawing band.

\* \* \* \* \*